United States Patent [19]

Fujita et al.

[11] 4,093,897

[45] June 6, 1978

[54] ELECTRIC MOTOR

[75] Inventors: Masahiko Fujita; Toshihiko Gotoh, both of Yokohama; Tsutomu Nakamura, Toyokawa, all of Japan

[73] Assignee: Hitachi, Ltd., Japan

[21] Appl. No.: 735,032

[22] Filed: Oct. 22, 1976

[30] Foreign Application Priority Data

Oct. 23, 1975 Japan .................................. 50-127768
Jan. 26, 1976 Japan .................................. 51-6666
Jan. 26, 1976 Japan .................................. 51-6668

[51] Int. Cl.$^2$ .............................................. H02P 5/06
[52] U.S. Cl. .................................. 218/138; 318/318; 310/268
[58] Field of Search ............... 310/268, 112; 318/318, 318/329, 138, 254

[56] References Cited

U.S. PATENT DOCUMENTS

3,402,333 9/1968 Hayner et al. ..................... 318/254
4,020,404 4/1977 Wilke et al. ......................... 318/318

Primary Examiner—Herman J. Hohauser
Attorney, Agent, or Firm—Craig & Antonelli

[57] ABSTRACT

An electric motor comprises a rotor constructed by a disk-shaped multi-pole magnet secured to a rotary shaft and rotatably supported, and a stator constructed by a pair of star-shaped flat drive coils arranged adjacent and opposing to the disk-shaped multi-pole magnet. Sinusoidal wave currents, the phase angles of which differ by 90° from each other, are supplied to the pair of drive coils to drive the magnet. A speed detection coil having a plurality of power generating strands is arranged in a field of the magnet and a field of the drive coils to produce a signal having a frequency corresponding to a rotational speed of the magnet. A cancellation coil is also arranged in the field of the drive coils to produce a voltage which varies with the change of the drive coils, which voltage is added to an output signal from the speed detection coil to cancel out a signal developed across the speed detection coil by the change of the drive field so that a speed detection signal of a high S/N ratio is derived to enable the control of the rotation of the electric motor.

11 Claims, 15 Drawing Figures

ELECTRIC MOTOR

The present invention relates to an electric motor in which a signal of a frequency corresponding to a rotational speed of a rotor is generated and compared with a reference voltage for the control of the rotational speed of the rotor. More particularly, the present invention relates to an electric motor for use in a disk record player and a magnetic tape recorder and player, in which the rotational speed of the electric motor is derived as a signal having a frequency proportional to the rotational speed of the motor for the control of the rotational speed.

In the disk record player which reproduces sound from a disk record or the magnetic tape recorder and player, it is necessary to rotate the disk record or feed a magnetic tape at a precise speed. If the speed changes, a reproduced signal from the disk record or the magnetic tape will be frequency-modulated resulting in wow-flutter. Particularly in an apparatus wherein a rotary shaft of the electric motor is directly coupled to a turn table or a capstan to directly drive them by the electric motor, the change in the rotational speed of the electric motor is directly reflected to the change in the reproduced signal. Accordingly, the rotational speed of the electric motor in such an apparatus should be more accurately maintained at a constant speed.

In order to maintain a constant rotational speed of the electric motor, one may convert a change in the rotational speed or the r.p.m. of a rotor of the electric motor to a signal whose frequency, voltage or capacitance varies, which signal is then compared with a reference frequency, voltage or capacitance signal representing the rotation when the rotor is being rotated at an exact rotational speed so that the rotational speed of the rotor is increased or decreased in accordance with a difference between the two signals for the control of the rotational speed of the rotor.

In one method of detecting the rotational speed of the rotor, a magnet is mounted on a rotary shaft of the rotor to be rotated therewith, and a power generation coil is arranged opposing to the magnet such that a flux from the magnet links to the power generation coil to cause it to generate a signal having a frequency corresponding to the rotational speed of the rotor for the detection of the rotational speed of the rotor. This method, however, requires the arrangement of the speed detection magnet, in addition to the rotor, on the rotary shaft of the electric motor. This increases the size of the electric motor and also makes it necessary to increase the number of magnet poles or the number of the power generation coils when the frequency of the signal generated in the power generation coils is to be raised, which results in further increase in size of the structure. Moreover, since the magnetic flux of the drive coil for driving the rotor links to the power generation coil, if the magnetic flux of the drive coil changes, a voltage which changes with the change of the magnetic flux is developed across the power generating coil, which voltage is added to a signal generated by the rotation of the rotor. As a result, a signal which precisely detects the rotational speed of the rotor cannot be derived from the power generation coil.

In the disk record player or the magnetic tape recorder and player, many components in addition to the electric motor are accommodated in a cabinet. Accordingly, it is desirable that the size of the electric motor is as small as possible and the motor having a large size as described above cannot be practically used.

In another method, a disk is mounted on the rotary shaft of the rotor, which disk is formed with a plurality of equally spaced slits on a periphery thereof. A light source such as a lamp is arranged on one side of the disk while a photo-sensor such as a phototransistor is arranged on the other side of the disk so that a light emitted from the light source passes through the slits in the disk to the photo-sensor to derive a signal from the photo-sensor, which signal has a frequency corresponding to the rotational speed of the rotor. This method, however, requires a shield for the light source and the photo-sensor to prevent the entrance of an external light. Furthermore, in order to raise the frequency of the signal derived from the photo-sensor, a number of light sources and photo-sensors should be arranged. This results in an electric motor of a complex construction.

When the change in the rotational speed of the electric motor is to be detected as a change in the frequency of the signal which is used to control the rotational speed of the electric motor, it is necessary to raise the frequency of the detected signal in order to enable the detection of a slight change in the rotational speed of the electric motor. In an electric motor to be used with an electronic instrument which handles a very small signal, it is desirable to prevent an electric and mechanical noise from occuring from the electric motor and at the same time it is desirable to be able to readily control the rotational speed of the electric motor.

By constructing the rotor of the electric motor by a permanent magnet and arranging the power generation coil in a magnetic field of the magnet to cause the power generation coil to generate a voltage in response to the change of the magnetic field due to the rotation of the magnet, a signal corresponding to the rotational speed of the magnet can be derived. By eliminating a voltage developed across the power generation coil by the magnetic field of the drive coil by an appropriate means, the rotational speed of the magnet can be accurately detected. In this manner an electric motor which is of small size and capable of controlling the rotational speed can be attained.

It is an object of the present invention to provide an electric motor which is small in size, flat in structure and capable of detecting a change of rotational speed as a change of frequency.

It is an object of the present invention to provide an electric motor which is capable of accurately detecting the rotational speed thereof.

It is a further object of the present invention to provide an electric motor which does not produce electric and mechanical noises and is capable of readily controlling the rotational speed.

The electric motor in accordance with the present invention comprises a rotor which is constructed by a disk-shaped multi-pole magnet coupled to a rotary shaft, the magnet having a plurality of magnet poles, and a stator which is constructed by a pair of drive coils having a plurality of driving sections arranged to link with magnetic fluxes of the magnet, the pair of drive coils being arranged to oppose to the magnet. A speed detection coil including $2n + 1$ power generation strands for each of the magnet poles, where $n$ is a positive integer, and extending radially around the rotation axis, is arranged in the magnetic field of the magnet and the magnetic field of the drive coils such that the magnetic fluxes of the magnet link with the plurality of power generation strands to cause them to generate a signal having a frequency corresponding to the rotational speed of the magnet. A cancellation coil which links with the magnetic fluxes of the drive coils is further arranged in the magnetic field of the drive coil whereby the cancellation coil generates a voltage having a frequency and an amplitude which change in accordance with the change of the magnetic field of the drive coils. This cancellation voltage is added to the signal produced by the speed detection coil to cancel out a voltage produced across the speed detection coil due to the change in the magnetic field of the drive coils for producing a noise-free speed detection signal from the speed detection coil.

The electric motor of the present invention further compares the signal developed across the speed detection coil with a reference voltage to control a power to be supplied to the drive coils in accordance with the difference between the two voltages for controlling the rotational speed of the electric motor.

According to the features of the present invention, the rotor is constructed by the disk-shaped, multi-pole magnet and the magnetic fluxes of the rotor magnet link with the speed detection coil including a plurality of power generation strands for each of the magnet poles of the rotor magnet. Accordingly, the electric motor of the present invention can be constructed into a flat and small structure and can produce a speed detection signal of a high frequency. Furthermore, the effect by the magnetic field of the drive coils can be eliminated and a slight change in the rotational speed of the rotor can be detected assuring a constant rotational speed.

The above and other objects, features and advantages of the present invention will become more apparent from the following detailed description of the preferred embodiments of the invention when taken in conjunction with the accompanying drawings, in which:

FIG. 6b is a plan view illustrating a relationship between the one drive coil and magnet when the magnet rotates by 22.5° from the position of FIG. 6a.

FIG. 6c is a plan view illustrating a relationship between the one drive coil and the magnet when the magnet rotates by 45° from the position of FIG. 6a.

Figure 1:
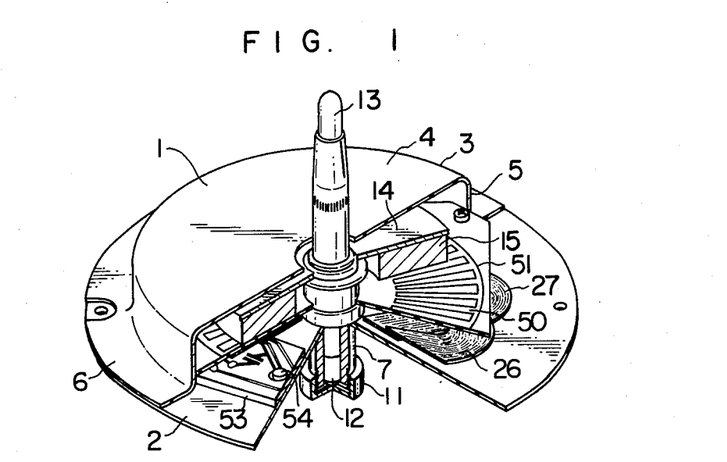
FIG. 1 is a perspective view, partly broken away, of a first embodiment of an electric motor in accordance with the present invention.
Figure 2:
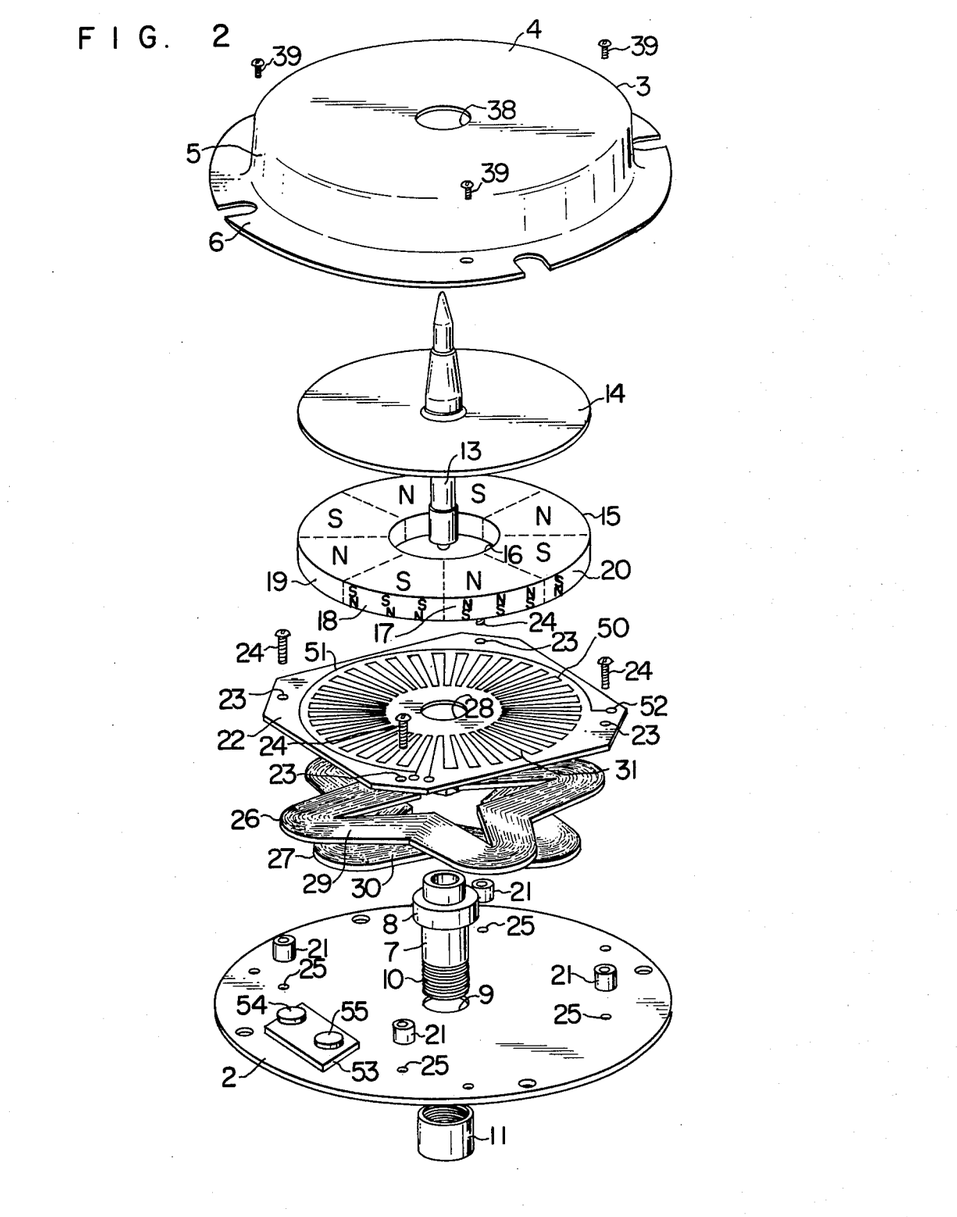
FIG. 2 is an exploded view of the electric motor shown in FIG. 1.
Figure 3:
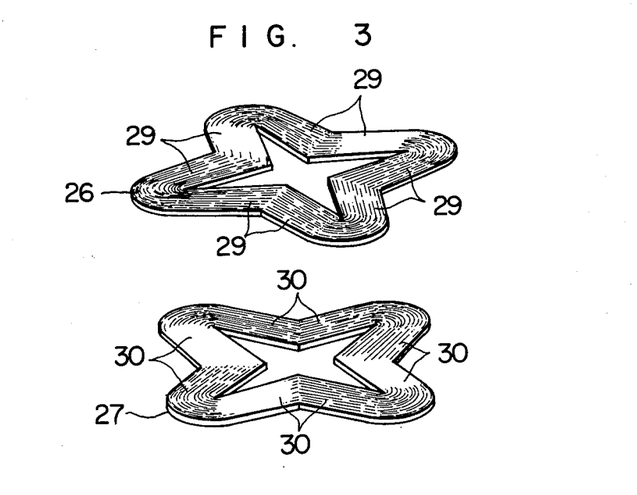
FIG. 3 is a perspective view of drive coils.
Figure 4:
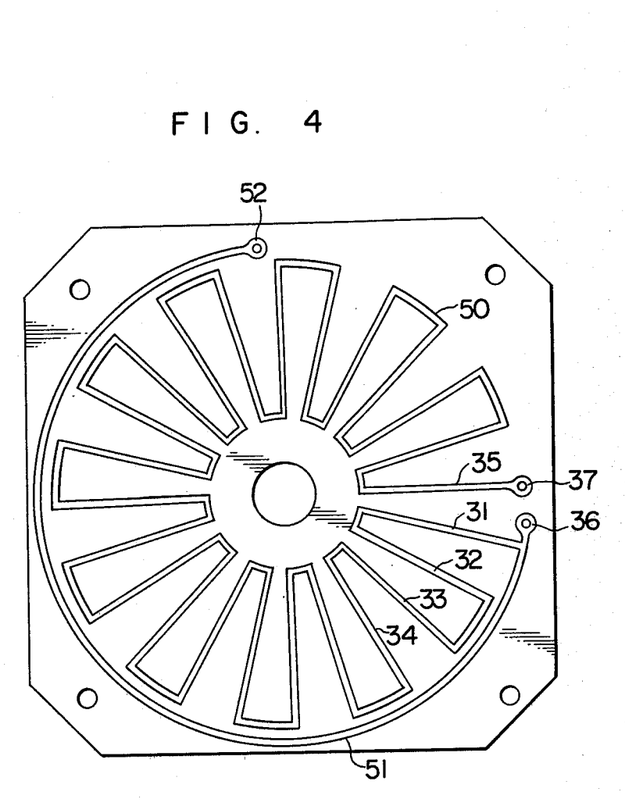
FIG. 4 is a plan view showing a first embodiment of a speed detection coil.

Now referring to FIGS. 1 and 2 which show a perspective view, partly broken away, of the electric motor according to the present invention and an exploded view thereof, respectively, the electric motor 1 comprises a disk-shaped base plate 2 made of a magnetic material such as iron or silicon steel and a cup-shaped top cover 3 mounted on the base plate 2. The top cover 3 has a top plate 4, a cylindrical portion 5 contiguous thereto and a rim 6, all made of magnetic material. The base plate 2 acts as a lower yoke and a cylindrical bearing 7 is fixed at the center thereof. The bearing 7 is made of non-magnetic material such as brass and formed with a rim 8 on an upper periphery thereof. The bearing 7 is inserted into a center bore 9 of the base plate 2 and fixed thereto such that the bottom surface of the rim 8 abuts against the base plate 2. A lower periphery of the bearing 7 is threaded at 10 to which a cap 11 is threadedly coupled. Ball bearings 12 are provided within the cap 11. A rotary shaft 13 is inserted into the bearing 7 from the top thereof. The lower end of the rotary shaft 13 bears on the ball bearings 12 so that the rotary shaft 13 is rotatably supported by the ball bearings 12 and the bearing 7. At the middle portion of the rotary shaft 13, an upper yoke 14 made of magnetic material such as iron or silicon steel is attached. A disk-shaped multi-pole magnet 15 is bonded by adhesive material to the bottom surface of the upper yoke 14. The disk-shaped multi-pole magnet 15 is circular and made of magnetic material such as aluminum-nickel-cobalt alloy or ferrite and has a center bore 16 through which the rotary shaft 13 extends to fix the magnet 15 to the upper yoke 14 coaxially with the rotary shaft 13. The magnet 15 is circumferentially divided into a plurality of sections, 8 sections in FIG. 2, and each of the subdivided sections 17, 18, 19, . . . 20 is magnetized with alternating polarity. For example, the subdivided section 17 is magnetized to N pole on the upper surface of the magnet 15 while the left and right adjacent subdivided sections 18 and 20 are magnetized to S pole, and the section 19 which is adjacent to the section 18 is magnetized to N pole. The sections 17, 18, 19, . . . 20 are magnetized in a direction of thickness of the magnet 15 such that when the upper surface of the section 17 is magnetized to N pole, the lower surface thereof is magnetized to S pole. Four washers 21 are arranged on the upper surface of the base plate 2 and an insulating plate 22 made of phenol resin or the like is mounted on the washers 21 with the bearing 7 extending through a center bore 28 of the insulating plate 28. Bolts 24 are inserted into bores 23 formed at four corners of the insulating plate 22, through the washers 21 and screwed into threads 25 formed in the base plate 2. The insulating plate 22 is attached to the base plate 2 while maintaining a space between the insulating plate 22 and the base plate 2 by the washers 21. A pair of drive coils 26, 27 are attached to the bottom surface of the insulating plate 22. As shown in FIG. 3, each of the pair of drive coils 26, 27 is of star shape having a number of turns of a fine copper wire coated with insulating coating. Each of the drive coils 26, 27 is formed into a flat star-shaped structure by initially establishing four points equally spaced from each other on a circumference of a circle having a diameter corresponding to an outer diameter of the magnet 15 and additional four points on a circumference of a circle having a diameter corresponding to an inner diameter of the magnet 15 and each shifted by 45° from corresponding one of the previously established four points, extending a fine copper wire from one of the inner points to the corresponding outer point, folding the wire thereat and extending the wire to the second inner point, folding the wire thereat and extending the wire to the second outer point, repeating similar steps for the third and fourth inner points and the third and fourth outer points to complete one turn, and repeating the above step a number of times. The pair of drive coils 26, 27 thus constructed are placed one on the other coaxially with the rotary shaft 13 and bonded by adhesive material to the insulating plate 22. The copper wires of the pair of drive coils 26, 27 extending from the outer periphery to the inner periphery or vice versa link to a magnetic flux of the magnet 15 defining drive sections 29 and 30 for driving the magnet 15 at the linking areas. The drive coils 26 and 27 are placed one on the other such that the drive sections 29 and 30 are angularly spaced by 22.5° circumferentially. A plurality of radially extending power generation strands 31 are provided on the upper surface of the insulating plate 22 and are connected in series to form a speed detection coil 50. As shown in FIG. 4, the speed detection coil 50 has a plurality of radially extending power generation strands 31, 32, 33, 34, . . . 35 on the upper surface of the insulating plate 22. The first strand 31, for example, is connected with the adjacent second strand 32 on the inner periphery side, and the second strand 32 is connected with the third strand 33 on the outer periphery side, and the third strand 33 is connected with the fourth strand 34 on the inner periphery side. In a similar manner, the remaining strands are connected with their adjacent strands alternately on the inner and outer periphery sides such that the strands 31, 32, 33, 34, . . . 35 are connected in series. The speed detection coil 50 may be a printed circuit coil, which may be formed by bonding a copper foil on the upper surface of the insulating plate 22, printing the strands 31, 32, 33, 34, . . . 35 and the interconnections therebetween on the copper foil and etching the copper foil while protecting the printed areas. The radially extending power generation strands 31, 32, 33, 34, . . . 35 are provided $2n + 1$ for each of the magnet poles of the magnet 15, where $n$ is a positive integer. The speed detection coil 50 shown in FIG. 4 is an example where $n = 1$ and three strands are provided for each magnet pole, and total of 24 strands are provided for the magnet 15 shown in FIG. 2 in which the magnet 15 is divided into 8 magnetized sections. The speed detection coil 50 shown in FIG. 2 is an example where $n = 4$ and nine strands are provided for each magnet pole, and total of 72 strands 31 are provided. The first strand 31 and the last strand 35 (the 24th strand in FIG. 4) have terminals 36 and 37 to which external leads are connected forming output terminals of the speed detection coil 50.

Arranged on the upper surface of the insulating plate 22 along the outer periphery of the speed detection coil 50 is an arcuate cancellation coil 51 which surrounds three quartes of the outer periphery of the speed detection coil. One end of the cancellation coil 51 is connected to the output terminal 36 of the first power generation strand 31 and the other end is connected to an output terminal 51. The cancellation coil 51 is connected in series with the speed detection coil 50. An insulating plate 53 is disposed on the base plate 2 and a pair of Hall effect elements 54 and 55 are mounted on the base plate around the rotary shaft 13 with the angular displacement of 22.5°. The pair of Hall effect elements 54 and 55 are arranged in the magnetic field of the magnet 15 near positions corresponding to the outer periphery of the magnet 15.

The cup-shaped top cover 3 has a center bore 38 formed in the top plate 4 thereof, into which center bore 38 the upper end of the rotary shaft 13 is inserted so that the rim 6 of the top cover 3 abuts against the base plate 2, and the rim 6 and the base plate 2 are coupled by bolts 39. The end of the rotary shaft 13 is tapered to form a center shaft for a turn table on which a disk record is mounted when the electric motor is used in a disk record player, and at the same time acts as a record guide along which a center bore of the disk record travels.

Figure 6A:
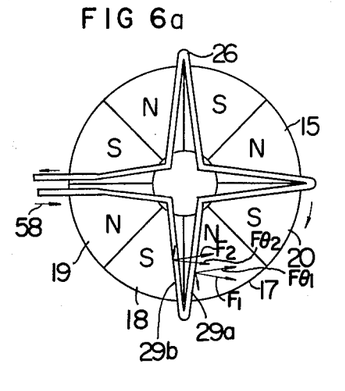
FIG. 6a is a plan view illustrating the relationship between one drive coil and a magnet.

In the electric motor thus constructed, when a unidirectional D.C. drive circuit is supplied to one of the pair of drive coils 26 and 27, e.g. to the drive coil 26, a drive magnetic field is produced at the drive coil 26 by the drive current. This drive magnetic field cooperates with the magnetic field of the magnet 15 to produce a drive force F. This is illustrated in FIGS. 6a–6d, in which the drive coil 26 is shown with the copper wire forming the coil thereof. When the D.C. current flowing in the direction of an arrow 58 is supplied to the drive coil 26, drive fluxes are generated at the drive sections 29 of the drive coils 26, which fluxes surrounding the drive sections 29 clockwise as viewed with respect to the direction of the current flow. When the drive sections 29 of the drive coil 26 are positioned above the magnet poles 17, 18, 19, . . . 20 of the magnet 15 as shown in FIG. 6a, counterclockwise forces are produced at the drive sections 29 in the direction normal thereto.

Figure 6B:
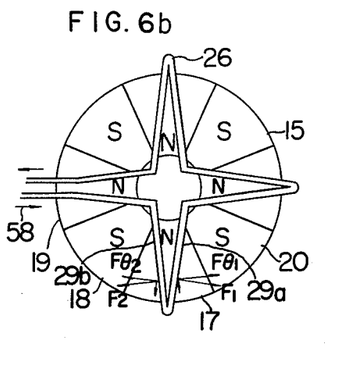

For example, the magnetic flux of the N-poled magnetic pole 17 and the magnetic flux of the drive section 29a positioned thereabove cooperate to produce at the drive section 29a a force $F_1$ which is normal thereto. Similarly, at the drive section 29b positioned above the S-poled magnetic pole 18, a force $F_2$ which is normal to the drive section 29b is produced. The forces $F_1$ and $F_2$ produced at the drive sections 29a and 29b are in the same direction and the component forces $F_{\theta 1}$ and $F_{\theta 2}$ of the forces $F_1$ and $F_2$ which act circumferentially of the magnet 15 produce a drive force F for the magnet 15. Since the drive coil 26 is fixed to the base plate 2, the drive force F generated at the drive coil 26 causes the magnet 15 to rotate so that the magnet 15 is rotated clockwise with the rotary shaft 13 around the rotary shaft 13. As the magnet 15 is rotated to a position where two drive sections 29 are positioned above one magnet pole as shown in FIG. 6b, the sum of the drive forces produced at the respective sections 29 is zero. That is, as shown in FIG. 6b, when the two drive sections 29a and 29b are positioned above the one magnet pole 17, the directions of the magnet fluxes linking to the two drive sections 29a and 29b are same and the directions of the currents flowing through the drive sections 29a and 29b are opposite. Therefore, the force $F_1$ produced at the drive section 29a and the force $F_2$ produced at the drive section 29b are same in their magnitudes and opposite in their directions and hence the component forces $F_{\theta 1}$ and $F_{\theta 2}$ acting circumferentially of the magnet 15 are same in their magnitudes and opposite in their directions resulting in zero drive force F for driving the magnet 15.

Figure 6C:
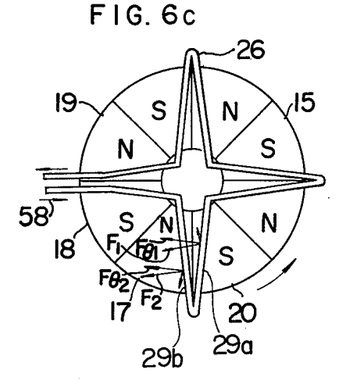
Figure 9:
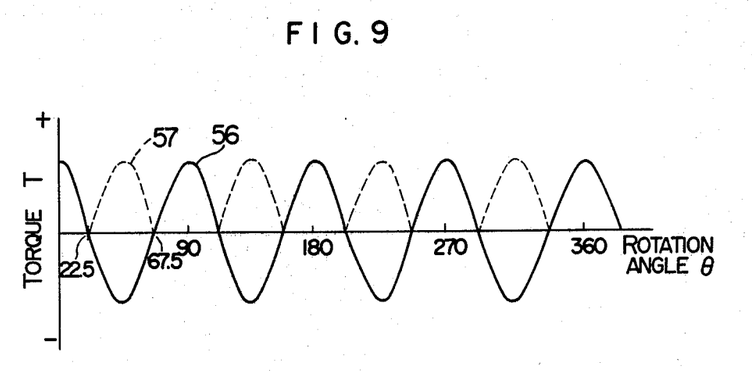
FIG. 9 shows a torque characteristic curve.

As the magnet 15 is further rotated by inertia to a position where the respective drive sections 29 are positioned above the corresponding magnetic poles, respectively as shown in FIG. 6c, the drive section 29a is now positioned above the S-poled magnet pole 20 and the drive section 29b is positioned above the N-poled magnet pole 17, as opposed to the case of FIG. 6a. As a result, the forces $F_1$ and $F_2$ produced at the drive sections 29a and 29b are opposite to those in FIG. 6a so that the magnet 15 is rotated counterclockwise and returned to the position shown in FIG. 6b. FIG. 9 shows a relation of a rotation angle $\theta$ of the magnet 15 and a torque T produced at the magnet 15 under the conditions of FIGS. 6a–6d. FIG. 9 shows a torque curve in which an abscissa represents the rotation angle $\theta$ of the magnet 15 and an ordinate represents a torque T. As shown by a solid line 56, at each 22.5° rotation of the magnet 15 the torque T becomes zero and a negative torque is produced between the rotation angles of 22.5° and 67.5°. Between 112.5° and 157.5°, 202.5° and 247.5°, and 292.5° and 337.5°, negative torque is also produced and the resultant torque derived from the sum of the negative torque and the positive torque is zero so that the magnet 15 cannot rotate. By reversing the direction of the drive current supplied to the drive coil 26 at the negative torque region, e.g. between 22.5° and 67.5°, a positive torque as shown by a broken line 57 is produced in this region.

Figure 6D:
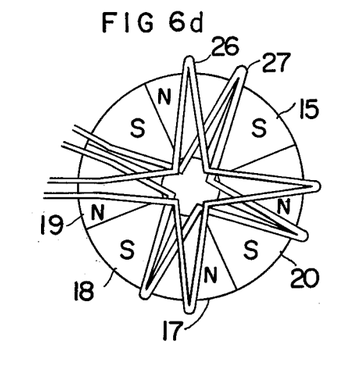
FIG. 6d is a plan view illustrating a relationship between a pair of drive coils and the magnet.

As shown in FIG. 6d, by superimposing one of the drive coils, 26 on the other drive coil 27 coaxially while angularly spacing them by 22.5° from each other and supplying sinusoidal wave drive currents the phases of which are different by 90° from each other, to the drive coils 26 and 27, the direction of the drive current flow is reversed for each 45° rotation of the magnet 15 and the drive current becomes zero for each 22.5° rotation of the magnet 15. Accordingly, the magnet is rotated in a given direction without requiring commutator or brush. One of the drive coils 26 and 27, e.g. the drive coil 26 is supplied with a sine wave current while the other drive coil 27 is supplied with a cosine wave current whose phase is different from that of the sine wave by 90°.

Figure 10A:
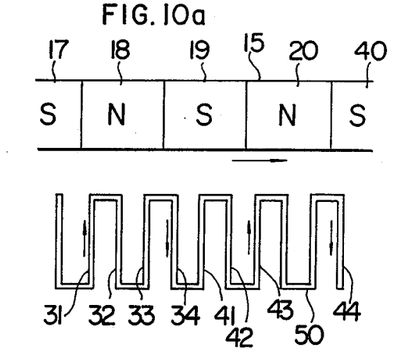
FIG. 10a is an exploded view of a speed detection coil and magnet wherein a number of strands of the coil is three per magnet pole.
Figure 10B:
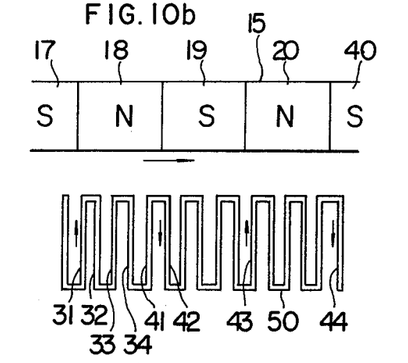
FIG. 10b is an exploded view of a speed detection coil and magnet wherein the number of strands of the coil is five per magnet pole.

As the magnet 15 rotates, the magnetic fluxes enamated from the magnet poles 17, 18, 19, . . . 20 of the magnet 15 move while linking to the power generation strands 31, 32, 33, 34, . . . 35 of the speed detection coil 50. When the magnetic fluxes linking to the strands 31, 32, 33, 34, . . . 35 change, those strands induce signals having amplitudes corresponding to the amounts of change of the magnetic fluxes and frequencies corresponding to the periods of the change. Those signals are produced across the strands when the boundaries of the magnet poles 17, 18, 19, . . . 20 of the magnet 15 pass above the strands. Since the strands 31, 32, 33, 34, . . . 35 are provided $2n + 1$ for each of the magnet poles of the magnet 15, the signals induced at the strands positioned at the boundaries of the magnet poles are of the polarity to allow the flow of signal currents in the same direction so that those signals are added together. FIGS. 10a and 10b are development views showing a relation among the power generation strands of the speed detection coil 50, the signals induced thereacross and the magnet poles, in which FIG. 10a shows an example where the number of the strands of the speed detection coil 50 per magnet pole is three, or $n = 1$, and FIG. 10b shows an example where $n = 2$. In FIG. 10a, the strands for the magnet pole 18 are the three strands 31, 32 and 33 while the strands for the magnet pole 19 are the next three strands 34, 41 and 42. Assuming that the magnet 15 moves to the right as shown by an arrow in FIGS. 10a and 10b, the magnetic flux linking to the strand 31 positioned near the boundary of the magnet poles 17 and 18 changes from the magnet flux of the magnet pole 18 to that of the magnet pole 17. As a result, the direction of the magnetic flux changes and a voltage is induced across the strand 31. As for the other strands 32 and 33, no voltage is induced thereacross because the magnetic fluxes linking thereto do not change. Assuming that the polarity of the voltage induced in the strand 31 is such that it allows a current to flow from the bottom to the top of the strand as shown by an arrow, a voltage of the polarity which allows downward current flow is induced in the strand 34 positioned near the boundary of the magnet poles 18 and 19. A voltage of the polarity which allows upward current flow is induced in the strand 43 positioned near the boundary of the magnet poles 15 and 20, and a voltage of the polarity which allows downward current flow is induced in the strand 44 positioned near the boundary of the magnet poles 20 and 40. Since the voltages induced in the strands 31, 34, 43 and 44 are of the polarity to cause the currents of the same direction to flow through the speed detection coil 50, these currents are added together to produce an output current. Similarly, in FIG. 10b, voltages induced in the strands 31, 42, 43 and 44 are of the polarity to cause the currents of the some direction to flow through the speed detection coil 50 and hence these currents are added together. Since more number of power generation strands are used in FIG. 10b than in FIG. 10a, the frequency of the induced voltage is higher in FIG. 10b than in FIG. 10a.

As the magnet 15 rotates, the magnetic flux linking to the strands sequentially changes so that the speed detection coil 50 induces a voltage having a frequency proporitional to the rotational speed of the magnet 15. Since the magnet 15 is divided into eight magnet poles, the rotational speed of the magnet 15 is detected at eight separate positions. As a result, the rotational speed of the magnet 15 can be precisely detected without being affected by the non-uniform magnetization of the magnet poles and the eccentricity of the magnet 15. Since the output signal from the speed detection coil 50 represents the change in the rotational speed of the magnet 15 as the change of the frequency, the frequency of the output signal is compared with a frequency of a reference signal to control the drive current supplied to the drive coils 26 and 27 in accordance with the difference of the frequencies for controlling the rotational speed of the magnet 15. Alternatively, the frequency of the output signal of the speed detection coil 50 may be converted to a voltage, which is compared with a reference voltage to control the rotational speed of the magnet 15.

While the speed detection coil 50 produces the signal having a frequency corresponding to the rotational speed of the magnet 15 by the plurality of power generation strands 31, 32, 33, 34, . . . 35 being linked by the magnetic flux of the magnet 15, since the speed detection coil 50 is disposed in the magnetic field of the pair of drive coils 26 and 27, a signal corresponding to the change in the magnetic field of the drive coils 26 and 27 is produced in the speed detection coil 50. Since the drive coils 26 and 27 are fed with sinusoidal A.C. currents as the drive current, the magnetic field of the drive coils 26 and 27 changes periodically. Where D.C. currents are supplied to the drive coils 26 and 27 and switched by a commutator and brush, the magnetic field of the drive coils 26 and 27 also changes. The signal produced in the speed detection coil 50 by the change in the magnetic field of the drive coils 26 and 27 appears as a noise to the speed detection signal for detection the rotational speed of the magnet 15 resulting in the reduction of a signal-to-noise ratio (S/N ratio) of the speed detection signal, which in turn makes it difficult to exactly indicate the rotational speed of the magnet 15.

The cancellation coil 51 arranged on the outer periphery of the speed detection coil 50 is disposed within the magnetic field of the drive coils 26 and 27. The cancellation coil 51 is linked by the magnetic flux of the drive coils 26 and 27 to produce a voltage which varies with the change of the magnetic field of the drive coils 26 and 27. Since the speed detection coil 50 and the cancellation coil 51 are connected in series as shown in FIG. 4, assuming that a voltage is induced in the speed detection coil 50 by the change in the magnetic flux of the drive coils 26 and 27 causing a current to flow, for example, from the power generation strand 35 through the speed detection coil 50 in a counterclockwise direction, this current flows through the cancellation coil 51 in the clockwise direction. Thus, it is opposite to the current flowing through the cancellation coil 51 by the voltage induced in the cancellation coil 51 and hence those currents cancel with each other. Accordingly, by taking the output signal of the speed detection coil 50 from the terminals 37 and 52, a speed detection signal which is not affected by the magnetic field of the drive coils 26 and 27 can be derived.

The radius and the arc length of the cancellation coil 51 are designed such that the cancellation coil 51 surrounds an amount of magnetic flux generated by the drive coils 26 and 27, which amount is substantially equal to the amount of magnetic flux surrounded by the speed detection coil 50 so that the voltage developed by the speed detection coil 50 and the voltage developed by the cancellation coil 51 are equal.

Figure 7:
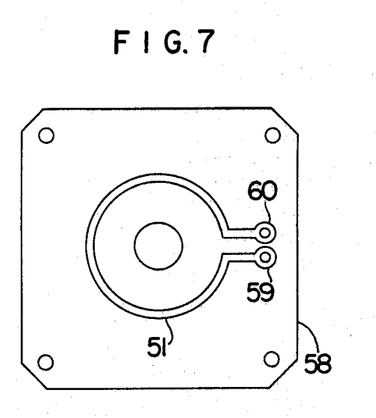
FIG. 7 is a plan view showing a first embodiment of a cancellation coil.
Figure 8:
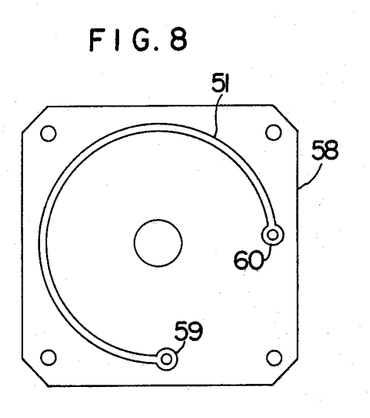
FIG. 8 is a plan view showing a second embodiment of the cancellation coil.

FIGS. 7 and 8 show examples where the cancellation coil 51 is solely formed on the insulating plate 58 using a printed circuit technique. In FIG. 7, the cancellation coil 51 is substantially circular and a small radius is employed to reduce the amount of magnetic flux which it surrounds. In FIG. 8, an arc having a large radius is used and the length of the cancellation coil 51 is three quarters of the circumferential length. The cancellation coil 51 may be connected in series to the speed detection coil 50 such that the voltage induced in the former is in opposite phase to the signal voltage induced in the latter, or it may be applied to an adder as shown in FIG. 11.

Figure 11:
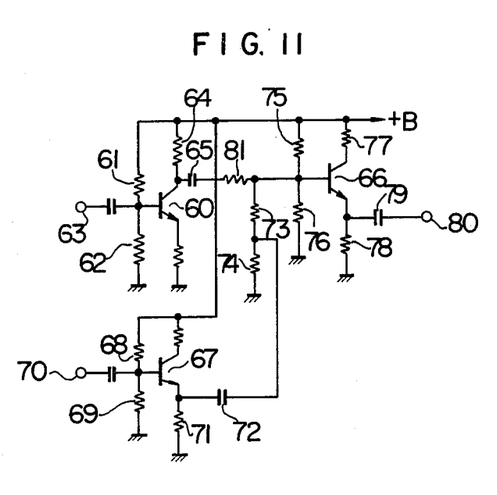
FIG. 11 shows a circuit diagram of an adder.

FIG. 11 shows a circuit diagram of the adder in which a phase inverting transistor 60 is supplied with a base bias through base biasing resistors 61 and 62, has its base connected to an input terminal 63, and its collector connected to a power supply through a collector resistor 64 and to a base of a summing transistor 66 through a capacitor 65 and a resistor 81. A voltage amplifying transistor 67 is fed with a base bias through base resistors 68 and 69 and has its base connected to an input terminal 70, its emitter grounded through an emitter resistor 71 and to a junction of two resistors 73 and 74 connected between the base of the transistor 66 and the ground, through a capacitor 72. The transistor 66 is fed with a base bias through resistors 75 and 76 and also fed with biases through a collector resistor 77 and an emitter resistor 78, respectively, and has its emitter connected to an output terminal 80 through a capacitor 79.

Since the output signal is taken from the collector of the transistor 60, the phase of the output signal is in opposite phase to that of the input signal and this output signal is fed to the transistor 66. The output signal from the transistor 67 is taken out of the emitter thereof and hence it is in phase with the input signal. This signal is also fed to the transistor 66. When the output signal of the speed detection coil 50 is applied to the input terminal 63 and the signal of the cancellation coil 51 is applied to the input terminal 70, these two signals are opposite in their phase and cancelled with each other when they are fed to the transistor 66. As a result, a signal indicative of the rotational speed of the magnet 15 is produced at the output terminal 80.

Figure 5:
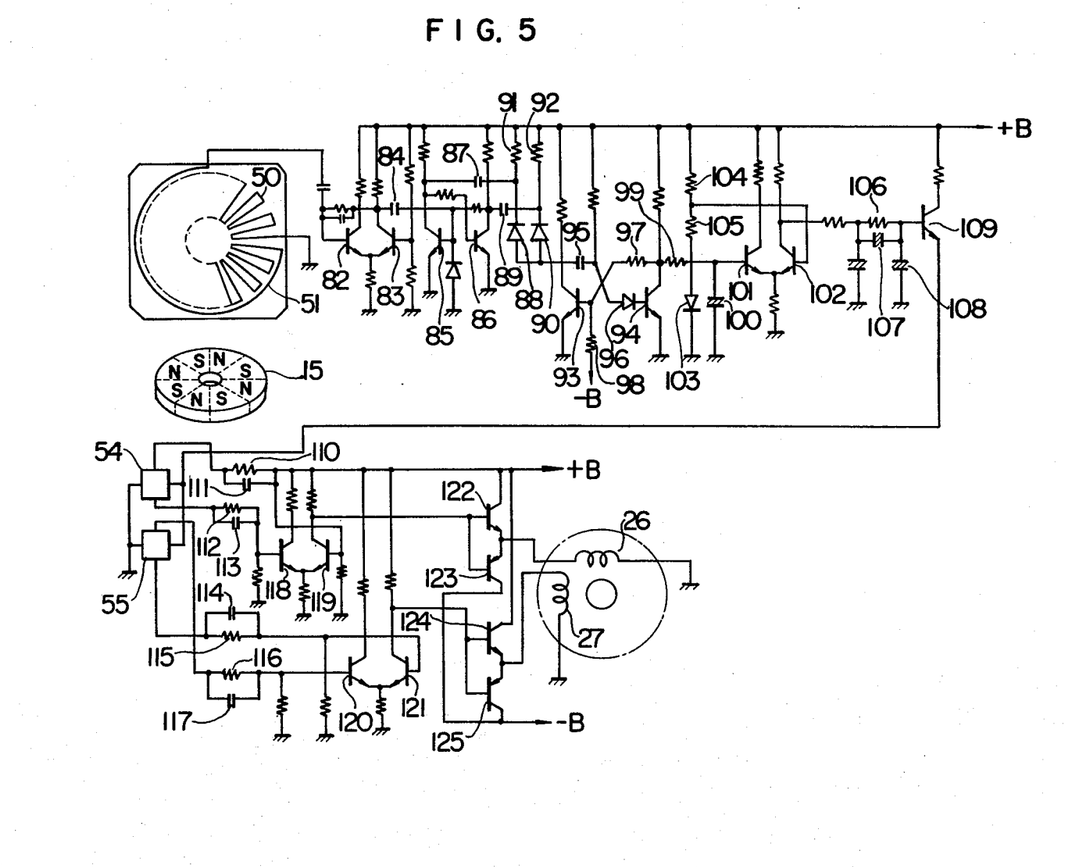
FIG. 5 is a circuit diagram of a drive circuit.

The electric motor shown in FIGS. 1 and 2 may be driven by a drive circuit shown in FIG. 5. Since the output signal of the speed detection coil 50 is of small amplitude and includes amplitude-modulated components, it is fed to a differential amplifier comprising transistors 82 and 83 and amplified thereby, and an output at a collector of the transistor 83 is fed through a capacitor 84 to a shaping transistor 85. Transistors 85 and 86 constitute an oversaturation amplifier having a large gain, which causes an input signal thereto to saturate into a square wave signal and eliminates the amplitude-modulated components. An output signal of the transistor 85 is fed through a capacitor 87 to a first frequency multiplying diode 88, and an output signal of the transistor 86 is fed through a capacitor 89 to a second frequency multiplying diode 90. The capacitors 87 and 89 together with resistors 91 and 92 constitute differentiating circuits to convert the square wave output signals of the transistors 85 and 86 to pulse signals, which pass through the diodes 88 and 90 and are added together to produce a signal of double frequency, which is then fed to a monostable multivibrator comprising a pair of transistors 93 and 94. A collector of the transistor 93 is connected to a base of the transistor 94 through a capacitor 95 and a diode 96, and a collector of the transistor 94 is connected to a base of the transistor 93 through a resistor 97, and the base of the transistor 93 is connected to a negative power supply through a resistor 98. When no trigger signal is applied to the transistors 93 and 94, the transistor 93 is cut off and the transistor 94 is conductive. When a negative trigger signal is applied externally, the condition is reversed such that the transistor 93 conducts while the transistor 94 cuts off, and after a predetermined time interval the condition is again reversed to the initial state and stabilized in that condition. When the transistor 94 is cut off, the collector voltage thereof is high resulting in a high output signal. The output signal from the diodes 88 and 90 is supplied to the transistors 93 and 94 as a trigger signal, and each time the trigger signal is applied the collector voltage of the transistor 94 rises. The output signal of the transistor 94 is supplied to a low pass filter comprising a resistor 99 and a capacitor 100 where it is converted to a D.C. voltage.

The magnitude of the D.C. voltage increases as the transistor 94 is cut off more frequently within a unit time and decreases as the transistor 94 is cut off less frequently. In this manner, the frequency of the output signal of the speed detection coil 50 is converted to a D.C. voltage the magnitude of which is large when the frequency is high and small when the frequency is low. The voltage from the low pass filter is fed to a first voltage comparing transistor 101 while a reference voltage from a reference voltage supply comprising a diode 103 and resistors 104 and 105 is applied to a secod voltage comparing transistor 102. The transistors 101 and 102 compare the two voltages and produces a differential voltage at the collector of the transistor 102, which is fed through a phase compensation circuit comprising a resistor 106 and capacitors 107 and 108 to a transistor 109 where it is D.C. amplified. An emitter current of the transistor 109 is supplied to an input terminal of a pair of Hall effect elements 54 and 55.

The Hall effect elements each produces an output voltage which is proportional to the strength of the magnetic field applied thereto and the current flowing therethrough. The pair of Hall effect elements are arranged near the outer periphery of the magnet 15 as shown in FIG. 2 and within the magnetic field of the magnet 15. The field distribution of the magnet 15 is sinusoidal distribution near the outer periphery of the magnet 15. Thus, by arranging the Hall effect elements 54 and 55 within the sinusoidal distribution, a sinusoidal output voltage can be produced. Since the Hall effect elements 54 and 55 are angularly displaced by 22.5° from each other, output voltages the phases of which differ by 90° from each other can be produced. The output voltages of the Hall effect elements 54 and 55 are fed through current limiting circuits comprising resistors 110, 112, 115 and 116, respectively and capacitors 111, 113, 114 and 117, respectively, to voltage amplifying transistors 118, 119, 120 and 121 respectively, where they are amplified. The output signal of the transistor 119 is fed to bases of a first pair of drive transistors 122 and 123 and the output signal of the transistor 121 is fed to bases of a second pair of drive transistors 124 and 125. The first and second pairs of the drive transistors 122, 123 and 124, 125 constitute push-pull power amplifiers respectively, and an output power from the transistor pair 122 and 123 is fed to one drive coil 26 while an output power from the transistor pair 124 and 125 is fed to the other drive coil 27.

In this circuit, as the rotational speed of the magnet 15 increases, the frequency of the output signal from the speed detection coil 50 rises and the output voltage from the low pass filter 99, 100 rises. This voltage is compared with the reference voltage and the compared result is taken out of the transistor 102 as a negative voltage, which reduces the emitter voltage of the transistor 109 resulting in the decrease in the current supplied to the Hall effect elements 54 and 55. As a result, the drive power supplied to the drive coils 26 and 27 decreases to reduce the rotational speed of the magnet 15. On the other hand, when the rotational speed of the magnet 15 is low, the compared output resulting from the comparison with the reference voltage is positive, which causes the current to be supplied to the Hall effect elements 54 and 55 to increase. Thus the drive current for the drive coils 26 and 27 increases and the rotational speed of the magnet 15 is increased.

In this manner, the frequency of the output signal of the speed detection coil is converted to a voltage which controls the drive currents to maintain a constant rotational speed of the magnet. Since the drive currents are derived from the pair of Hall effect elements and they are sinusoidal wave currents the phases of which are different by 90° from each other, the torque of the magnet can be maintained at a constant value and the variation of the torque can be eliminated.

As described hereinabove, the electric motor in accordance with the present invention generates a signal for enabling the detection of the rotation of the magnet by means of the magnet which constitutes the rotor, produces a speed detection signal which is of a high S/N ratio and which is not affected by the drive field, and controls the rotational speed of the motor with a simple construction. Since the magnet is of plate-shape and the drive coils are thin, the entire motor is flat. By constructing the speed detection coil and the cancellation coil by printed circuit coils, the motor can be constructed into a flat structure and perform accurate speed control. By the use of the printed circuit technology, the strands of the speed detection coil can be precisely positioned and the number of the strands can be increased so that the speed control signal of a high frequency can be obtained. Furthermore, since the drive coils are driven by the sinusoidal wave drive currents, no commutator nor brush is required assuring a noise-free electric motor.

What is claimed is:

1. An electric motor comprising:
   a rotary shaft,
   a disk-shaped multi-pole magnet coupled to said rotary shaft and having a plurality of discrete magnet poles,
   a pair of drive coils arranged within a magnetic field of said magnet and having drive sections which are linked by magnetic fluxes of said magnet,
   means for supplying drive currents to said pair of drive coils to cause them to generate a drive magnetic field,
   a speed detection coil arranged within the magnetic field of said magnet and the drive magnetic field of said pair of drive coils for generating a signal having a frequency corresponding to the rotational speed of said magnet,
   a cancellation coil arranged within the magnetic field of said drive coil for generating a voltage having a frequency and an amplitude both of which vary with the change in the drive magnetic flux of said drive coils, and
   means for adding the voltage generated at said cancellation coil to the signal generated at said speed detection coil to cancel a voltage generated at said speed detection coil due to the change in the drive magnetic flux of said drive coils.

2. An electric motor comprising;
   a rotary shaft,
   a disk-shaped multi-pole magnet coupled to said rotary shaft and having a plurality of discrete magnet poles,
   a pair of drive coils arranged within a magnetic field of said magnet and having drive sections which are linked by magnetic fluxes of said magnet,
   means for supplying sinusoidal wave drive currents of different phase to said pair of drive coils to cause them to generate a drive magnetic field,
   a speed detection coil arranged within the magnetic field of said magnet and the drive magnetic field of said pair of drive coils and having a plurality of series-connected power generation strands which are linked by the magnetic fluxes of said magnet for generating a signal having a frequency corresponding to the rotational speed of said magnet,
   a cancellation coil arranged within the magnetic field of said drive coils for generating a voltage having a frequency and an amplitude both of which vary with the change in the drive magnetic flux of said drive coils, and
   means for adding the voltage generated at said cancellation coil to the signal generated at said speed detection coil to cancel a voltage generated at said speed detection coil due to the change in the drive magnetic flux of said drive coils.

3. An electric motor according to claim 2, wherein the signal generated at said speed detection coil and the signal generated at said cancellation coil are applied to an adder to cancel the signal generated at said speed detection coil due to the change in the drive magnetic flux of said drive coils.

4. An electric motor according to claim 2 wherein said cancellation coil is connected in series with said speed detection coil to generate a voltage which is of opposite phase and same amplitude with respect to the voltage generated at said speed detection coil due to the change in the drive magnetic flux of said drive coils.

5. An electric motor according to claim 2 wherein said cancellation coil is arranged along an arcuate path around an outer periphery of said speed detection coil, said cancellation coil and said speed detection coils being disposed on a common insulating plate.

6. An electric motor comprising; p1 a rotary shaft,
a disk-shaped multi-pole magnet coupled to said rotary shaft and having a plurality of discrete magnet poles,
said magnet poles being magnetized in a direction of thickness of said magnet with each magnet pole being magnetized in an opposite direction with respect to adjacent magnet poles,
a pair of drive coils arranged within a magnetic field of said magnet and non-rotatably mounted in parallel with and opposing to a disk surface of said magnet,
said pair of drive coils each having a plurality of drive sections which are linked by magnetic fluxes of said magnet,
means for supplying drive currents to said pair of drive coils to cause them to generate a drive magnetic field,
a speed detection coil arranged within the magnetic field of said magnet and the drive magnetic field of said drive coils and having power generation strands, $2n+1$ strands for each of the magnet poles of said magnet, where $n$ is a positive integer, which strands are linked by the magnetic fluxes of said magnet,
a cancellation coil arranged within the magnetic field of said pair of drive coils for generating a voltage having a frequency and an amplitude both of which vary with the change in the magnetic fluxes of said drive coils, and
means for adding the voltage generated at said cancellation coil to a signal generated at said speed detection coil due to the change in the magnetic fluxes of said pair of drive coils, in opposite phase relation to each other.

7. An electric motor according to claim 6 wherein said plurality of power generation strands of said speed detection coil extend radially and linked by the magnetic fluxes of said magnet, each of said strands being connected in series with adjacent strands.

8. An electric motor according to claim 6 wherein said pair of drive coils are coaxially disposed one from the other with each being circumferentially displaced by 22.5° from each other, and said pair of coils are fed with sinusoidal drive currents the phases of which differ by 90° from each other.

9. An electric motor comprising;
a yoke made of magnetic material,
a bearing secured to said yoke,
a rotary shaft rotatably supported by said bearing,
a disk-shaped multi-pole magnet secured to said rotary shaft and having a plurality of magnet poles,
said magnet poles being magnetized in a direction of thickness of said magnet with each magnet pole being magnetized in an opposite direction with respect to adjacent magnet poles,
a pair of drive coils secured to said yoke and each having a plurality of drive sections which are linked by magnetic fluxes of said magnet,
a pair of Hall effect element disposed within a magnetic field of said magnet and linked by the fluxes of said magnet,
means for supplying output signals from said pair of Hall effect elements to said pair of drive coils, respectively, as drive currents thereto,
a speed detection coil secured to said yoke and arranged within the magnetic field of said magnet and the magnetic field of said drive coils,
said speed detection coil having a plurality of radially extending, series-connected power generation strands, $2n+1$ strands for each of the magnet poles of said magnet, where $n$ is a positive integer,
a cancellation coil secured to said yoke and linked by the magnetic fluxes of said pair of drive coils for generating a voltage having a frequency and a voltage both of which vary with the change in the magnetic fluxes of said drive coils, and
means for adding the voltage generated at said cancellation coil to the output signal from said speed detection coil for cancelling a signal generated at said speed detection coil due to the change in the magnetic fluxes of said pair of drive coils.

10. An electric motor capable of controlling a rotational speed thereof comprising;
a rotatably supported disk-shaped multi-pole magnet having a plurality of discrete magnet poles each being magnetized to have opposite polarity with respect to adjacent magnet poles,
a pair of drive coils non-rotatably arranged within a magnetic field of said magnet and each having a plurality of drive sections which are linked by magnetic fluxes of said magnet and each being supplied with a drive current to generate a drive magnetic field,
a speed detection coil arranged within the magnetic field of said magnet and the magnetic field of said drive coils and having a plurality of series connected power generation strands which are linked by the magnetic fluxes of said magnet for generating a signal having a frequency corresponding to the rotational speed of said magnet,
a pair of Hall effect elements disposed within the magnetic field of said magnet and linked by the magnetic fluxes of said magnet,
a pair of power amplifier for amplifying output signals from said pair of Hall effect elements to supply drive currents to said pair of drive coils,
a cancellation coil non-rotatably arranged within the magnetic field of said drive coils and linked by the magnetic fluxes of said drive coils for generating a voltage having a frequency and an amplitude both of which vary with the change in the magnetic field of said drive coils,
means for adding the voltage generated at said cancellation coil to the signal generated at said speed detection coil to cancel the signal generated at said speed detection coil due to the change in the magnetic fluxes of said drive coils, a voltage-frequency converter fed with an output signal from said speed detection coil for generating a voltage corresponding to a frequency of said output signal, a reference voltage source having a reference voltage, a voltage comparator for receiving an output voltage from said frequency-voltage converter and said reference voltage to produce a differential voltage of said two voltages, and means for applying an output voltage of said voltage comparator to said Hall effect elements.

11. In an electric motor comprising;

a rotor including a disk-shaped multi-pole magnet having a plurality of discrete magnet poles with each magnet pole being magnetized in a direction of thickness of the magnet and each magnet pole having an opposite polarity with respect to adjacent magnet poles, and a rotary shaft extending through a center of said magnet and secured thereto, and a stator including a pair of drive coils arranged with a magnetic field of said magnet to face to said magnet so as to be linked by magnetic fluxes of said magnet and each having a plurality of drive sections, and a speed detection coil arranged within the magnetic field of said magnet and a magnetic field of said drive coils for generating a voltage having a frequency corresponding to a rotational speed of said magnet.

an improvement comprising;

a cancellation coil arranged within the magnetic field of said drive coils for generating a voltage having a frequency and an amplitude both of which vary with the change in the magnetic fluxes of said drive coils, and means for adding the voltage generated at said cancellation coil to the voltage generated at said speed detection coil, in the polarity to effect the cancellation.

* * * * *